US011901098B1

(12) United States Patent
Pusthay et al.

(10) Patent No.: US 11,901,098 B1
(45) Date of Patent: Feb. 13, 2024

(54) ASSEMBLIES FOR MITIGATING DRY BAND ARCING ON POWER DISTRIBUTION LINE INSULATORS

(71) Applicant: TE Connectivity Solutions GmbH, Schaffhausen (CH)

(72) Inventors: Kiran Pusthay, Cary, NC (US); Senthil A. Kumar, Morrisville, NC (US)

(73) Assignee: TE CONNECTIVITY SOLUTIONS GmbH, Schaffhausen (CH)

(*) Notice: Subject to any disclaimer, the term of this patent is extended or adjusted under 35 U.S.C. 154(b) by 0 days.

(21) Appl. No.: 17/875,673

(22) Filed: Jul. 28, 2022

(51) Int. Cl.
*H01B 17/38* (2006.01)
*H01B 17/02* (2006.01)
*H01B 17/42* (2006.01)
*H01B 17/50* (2006.01)

(52) U.S. Cl.
CPC ............. *H01B 17/38* (2013.01); *H01B 17/02* (2013.01); *H01B 17/42* (2013.01); *H01B 17/50* (2013.01)

(58) Field of Classification Search
CPC ........ H01B 17/38; H01B 17/02; H01B 17/42; H01B 17/50
See application file for complete search history.

(56) References Cited

U.S. PATENT DOCUMENTS 4,476,155 A * 10/1984 Niemi .................... H01B 19/04 252/573
4,749,824 A * 6/1988 Orbeck .................. H01B 17/42 524/588
7,154,036 B2 * 12/2006 Lynch ...................... H02G 7/00 174/138 F
7,839,256 B2 * 11/2010 Bradford ................ H01B 17/00 337/186
8,618,412 B2 * 12/2013 Lynch .................... H01B 17/00 119/713
8,772,633 B2 * 7/2014 Behnken ................ H01B 19/00 174/138 R
8,957,314 B2 * 2/2015 Niles ........................ H02G 7/00 174/172
10,881,097 B2 * 1/2021 Lynch .................... H01B 17/56

(Continued)

*Primary Examiner* — William H. Mayo, III
*Assistant Examiner* — Rhadames Alonzo Miller

(57) ABSTRACT

The present disclosure describes an assembly adapted for mitigating dry band arcing on power distribution line insulators. The assembly includes a polymeric insulator for power distribution line having a core, two end fittings affixed to opposing ends of the core, and a housing circumferentially surrounding the core. The housing including an upper end section and a lower end section each overlapping a respective end fitting, and a series of axially spaced apart annular sheds projecting radially outwardly from an outer surface of the housing. The device further includes a cover having a main body including a sidewall and a top wall, the sidewall and the top wall together define a cavity. A lower edge of the sidewall defines a lower opening and the top wall includes an upper opening, both the lower and upper openings being in communication with the cavity. At least a portion of the upper end section of the housing is received through the upper opening of the cover and one or more of the annular sheds are received within the cavity of the cover. Methods of mitigating dry band arcing on power distribution line insulators are also described.

18 Claims, 13 Drawing Sheets

(56) References Cited

U.S. PATENT DOCUMENTS

| | | | | |
|---|---|---|---|---|
| 10,958,046 | B2 * | 3/2021 | Lynch | H02B 1/06 |
| 2002/0100605 | A1 * | 8/2002 | Ramarge | H01B 17/50<br>174/137 A |
| 2006/0003622 | A1 * | 1/2006 | Lynch | H02G 7/00<br>439/404 |
| 2007/0102783 | A1 * | 5/2007 | Waters | H01B 17/42<br>257/510 |
| 2008/0128163 | A1 * | 6/2008 | Bradford | H01H 31/127<br>174/5 R |
| 2010/0218988 | A1 * | 9/2010 | Lynch | H02G 7/00<br>174/5 R |
| 2013/0299230 | A1 * | 11/2013 | Lynch | H01B 17/00<br>174/5 R |
| 2022/0413241 | A1 * | 12/2022 | Baker | G02B 6/442 |

* cited by examiner

ASSEMBLIES FOR MITIGATING DRY BAND ARCING ON POWER DISTRIBUTION LINE INSULATORS

FIELD

The present invention relates to covers for insulators for power distribution lines, and more particularly, to covers and assemblies adapted for mitigating dry band arcing on polymeric insulators for power distribution lines.

BACKGROUND

Support structures, such as utility poles, are often used to suspend electrical lines, such as power distribution lines, above the ground. These support structures are generally located outdoors and may be of a variety of different configurations to suspend one or more lines. Composite polymer insulators are used to support electrical power conductors and to secure electrical power conductors to the support structures. In particular, composite polymer insulators are commonly used to support and attach high voltage (HV) power lines. As used herein, "high voltage" means a power line operating at a voltage of 69 kilovolts (kV) or greater. Composite polymer insulators typically include an elongate, electrically insulating core, an electrically insulating housing surrounding the core, and end fittings affixed to the ends of the core. See, e.g., FIGS. 1A-1B. The core provides mechanical strength. The end fittings may be formed of metal (e.g., steel) and are configured to couple the ends of the insulator to cables and/or supports. The core may be formed of fiberglass composite material (e.g., fiberglass reinforced resin). The housing may be formed of an elastomeric material (e.g., silicone rubber). The housing may be mounted on the core by molding (e.g., injection molding) or by inserting the core into a preformed housing.

The housing may also include radially outwardly projecting sheds. The sheds help to maximize the creep (or leakage) distance of the insulator by increasing the surface distance on the insulator from end to end and help remove environmental contaminants (e.g., salt, pollution, dust) from the insulator in wet conditions (e.g., rain). Creep or leakage distance represents the shortest distance along the surface of the insulator between the conductive ends of the insulator. Environmental contaminants can have a strong effect on insulator performance. The more surface contaminants on the insulator, the more likely leakage current will occur since many of the contaminants are conductive. It is desirable to have an insulator shape that will help prevent current from "leaking" along the surface of the insulator from live electrical circuits to ground. Current leakage may cause damage to and eventual failure of the insulator.

One problem with electrical lines as described above, particularly with power distribution lines that transmit electrical power at high voltages, is dry band arcing. Dry band arcing is a common phenomenon observed in the composite polymeric insulators for these power distribution lines, especially in contaminated (e.g., polluted, wet) service areas. When an insulator gets wet, a thin film of water can form on the surface and a small leakage current may start to flow. When this film of water evaporates due to a rise in atmospheric temperature, a "dry band" forms on the surface of the insulator. The dry band interrupts the current flow and a voltage gradient appears across the dry band. The voltage gradient exerts electrostatic stress across the surface and causes further water evaporation and an increase in the width of the dry band, thus creating a higher voltage gradient which causes minor arcing. Dry band arcing results in visible arcs and audible noise and can often generate customer complaints. These dry band arcing events can last from a few days to several weeks in certain environmental conditions, for example, during times of high dew/moisture.

SUMMARY

Embodiments of the present invention are directed to covers that are adapted for use on polymeric insulators for power distribution lines to help mitigate dry band arcing from occurring along the insulator. In some embodiments, the covers help prevent a film of water from forming on the housing and/or annular sheds of the insulator, thereby helping to mitigate conditions that could cause dry band arcing. In addition, in some embodiments, the covers increase the creep or leakage distance along the surface of the insulator between the conductive ends of the insulator, thereby helping to mitigate current leakage that may cause damage to and/or eventual failure of the insulator.

Further embodiments of the present invention are directed to an assembly adapted for mitigating dry band arcing. The assembly includes a polymeric insulator for a power distribution line having a core, two end fittings affixed to opposing ends of the core, and a housing circumferentially surrounding the core. The housing including an upper end section and a lower end section each overlapping a respective end fitting, and a series of axially spaced apart annular sheds projecting radially outwardly from an outer surface of the housing. The assembly further includes a cover having a main body including a sidewall and a top wall, the sidewall and the top wall together define a cavity. A lower edge of the sidewall defines a lower opening and the top wall includes an upper opening, both the lower and upper openings being in communication with the cavity. At least a portion of the upper end section of the housing is received through the upper opening of the cover and one or more of the annular sheds are received within the cavity of the cover.

Further embodiments of the present invention are directed to a cover for an insulator for a power distribution line. The cover includes a main body including a sidewall and a top wall. The sidewall and the top wall together define a cavity. A lower edge of the sidewall defines a lower opening in communication with the cavity and a top surface of the top wall of the cover is tapered or angled. The cover further includes a collar extending upwardly from the top wall and an upper edge of the collar defines an upper opening in communication with the cavity. The upper opening is configured to receive at least a portion of a housing of the insulator and the cavity is configured to receive one or more annular sheds extending radially outwardly from the housing of the insulator.

Further embodiments of the present invention are directed to a method for mitigating dry band arcing on a polymeric insulator for a power distribution line. The method includes (a) providing a polymeric insulator for power distribution line having a core, two end fittings affixed to opposing ends of the core, and a housing circumferentially surrounding the core, the housing including an upper end section and a lower end section each overlapping a respective end fitting, and a series of axially spaced apart annular sheds projecting radially outwardly from an outer surface of the housing; (b) providing a cover having a main body including a sidewall and a top wall, the sidewall and the top wall together define a cavity, a lower edge of the sidewall defines a lower opening and the top wall having an upper opening, and the lower and upper openings being in communication with the cavity; (c) forcing the cover downwardly onto the housing of the insulator such that one or more annular sheds of the insulator is received into the cavity of the cover; and (d) continuing to force the cover downwardly until at least portion of the upper end section of the housing is received through the upper opening of the cover.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1A:
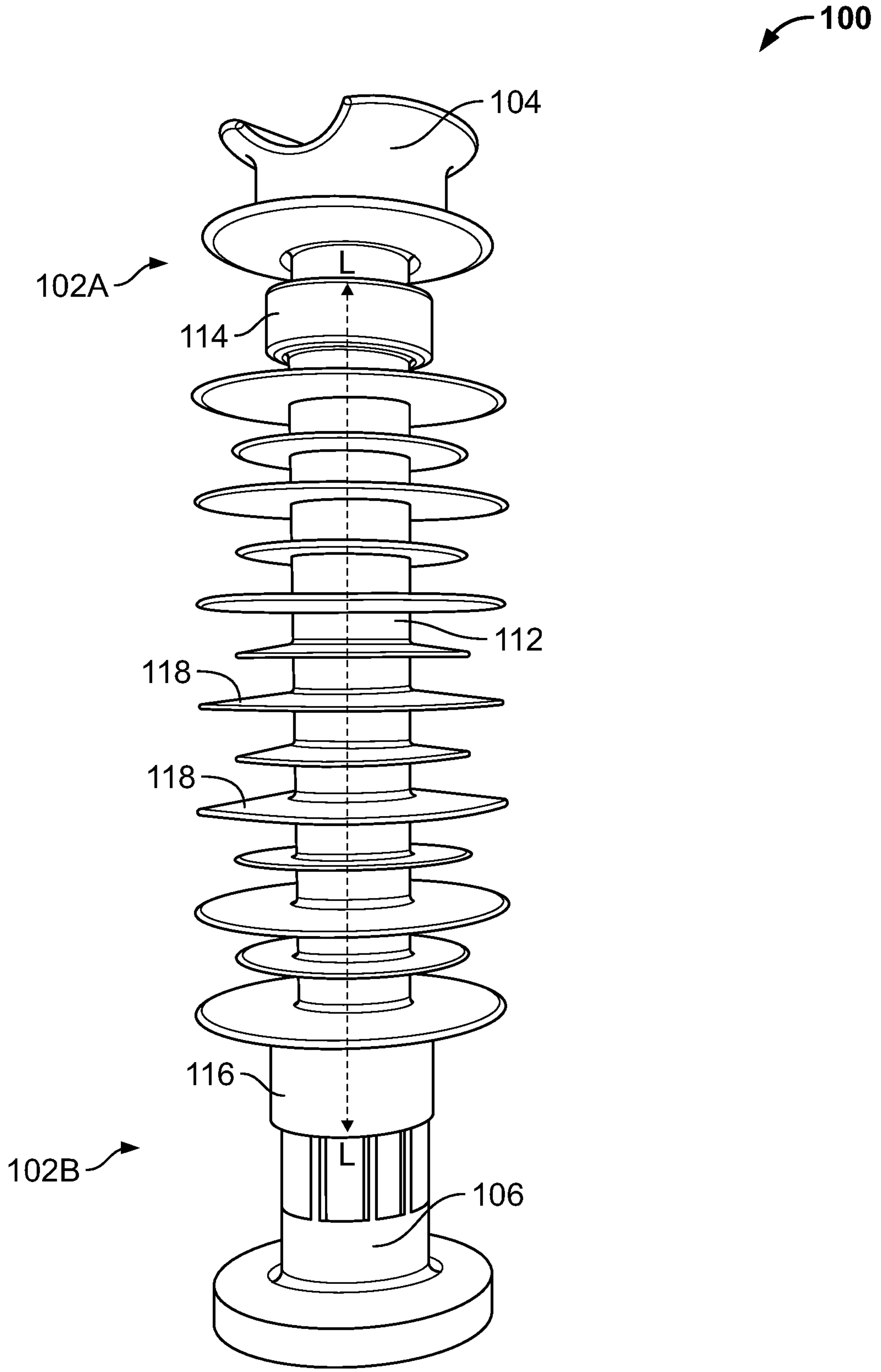
FIG. 1A (PRIOR ART)
FIG. 1A is a perspective view of a typical polymeric insulator for power distribution lines.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention will now be discussed in greater detail below with reference to FIGS. 1A-8.

Figure 1B:
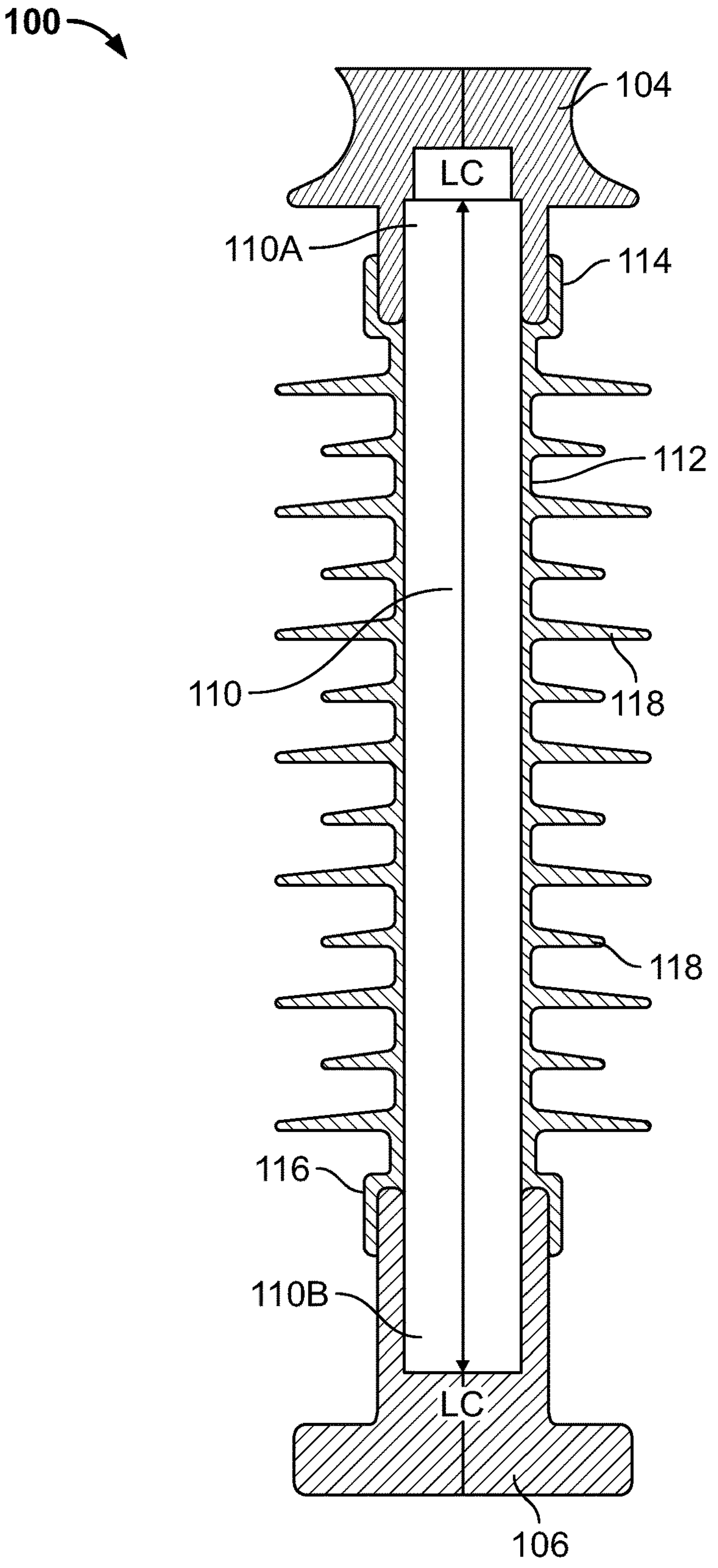
FIG. 1B (PRIOR ART)
FIG. 1B is a cross-sectional side view of the insulator of FIG. 1.

As noted above, a known composite polymer insulator 100 is illustrated in FIGS. 1A-1B. The insulator 100 can be used to mechanically separate and electrically isolate first and second components. Typically, one of the components is an electrical power transmission conductor and the other component is an electrical power transmission conductor or a support structure. Generally, the insulator 100 has an insulator lengthwise axis L-L and axially opposed ends 102A, 102B.

In some embodiments, the insulator 100 forms a part of an electrical power distribution system, such as a utility electrical power distribution system, for example. It will be appreciated that the insulator 100 may be used in any application or electrical power distribution system in which composite polymeric insulators of this type may be used. The support structure may take other forms and the configuration of the insulator 100 may be modified to accommodate different applications. For example, the insulator 100 may be incorporated into the system as a standoff insulator between a conductor and a bracket. In other embodiments, the insulator 100 may be secured by couplings to and between two elongate conductors (e.g., electrical power lines) such that the insulator 100 spans the distance between the conductors and mechanically spaces and electrically isolates the conductors from one another.

Figure 4A:
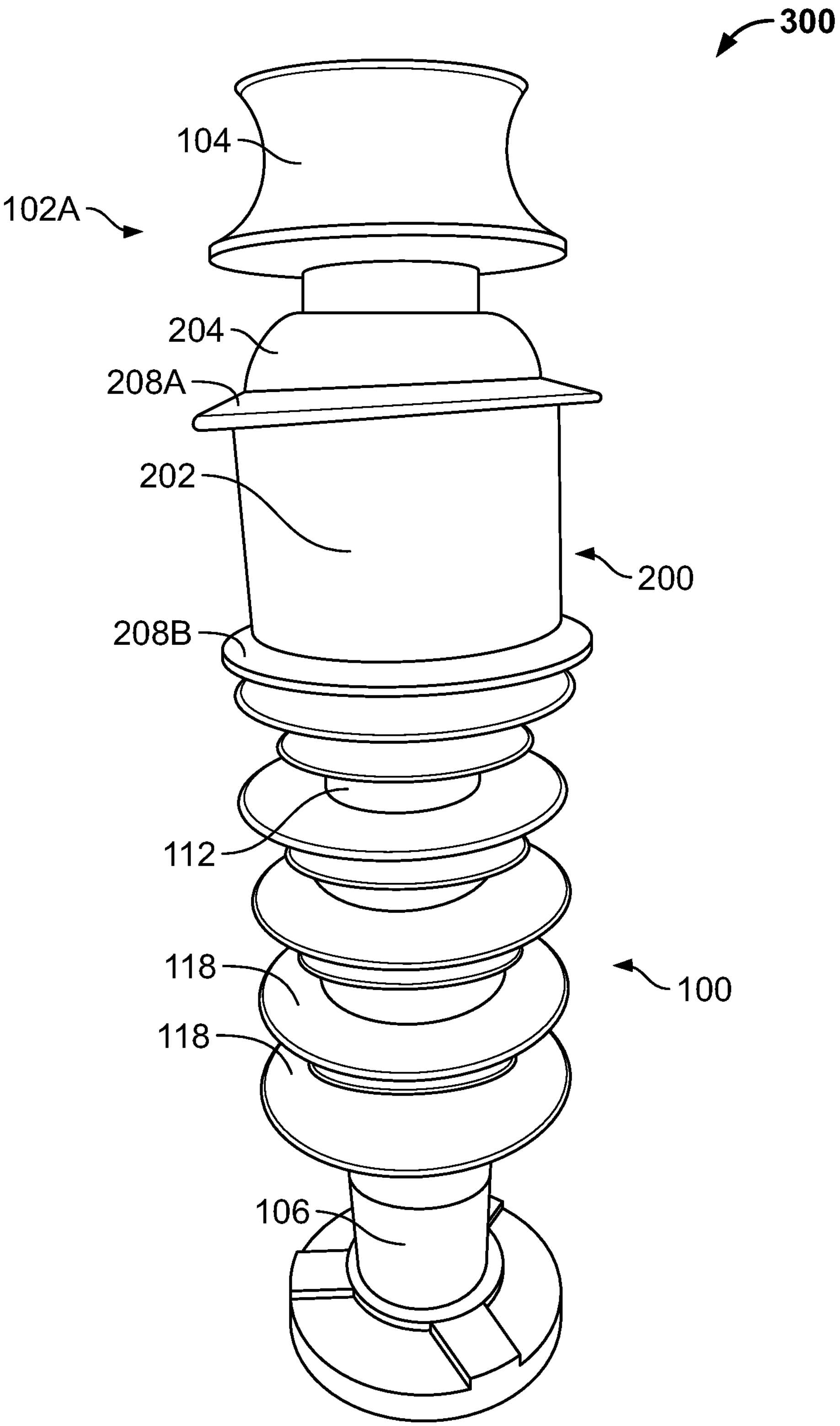
FIG. 4A is a perspective view of an assembly adapted for mitigating dry band arcing utilizing the cover of FIG. 2 according to embodiments of the present invention.
Figure 4B:
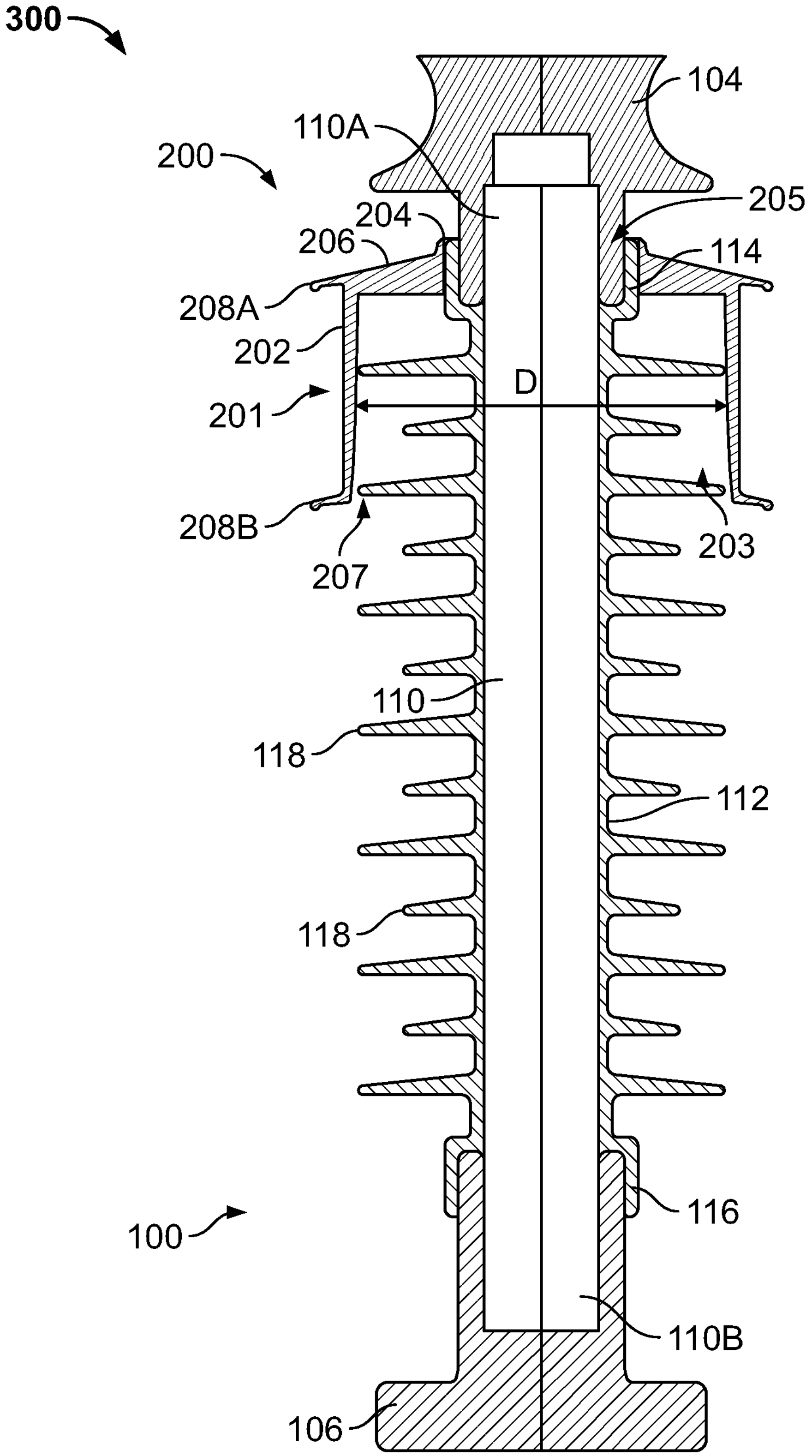
FIG. 4B is a cross-sectional side view of the assembly of FIG. 4A.
Figure 6A:
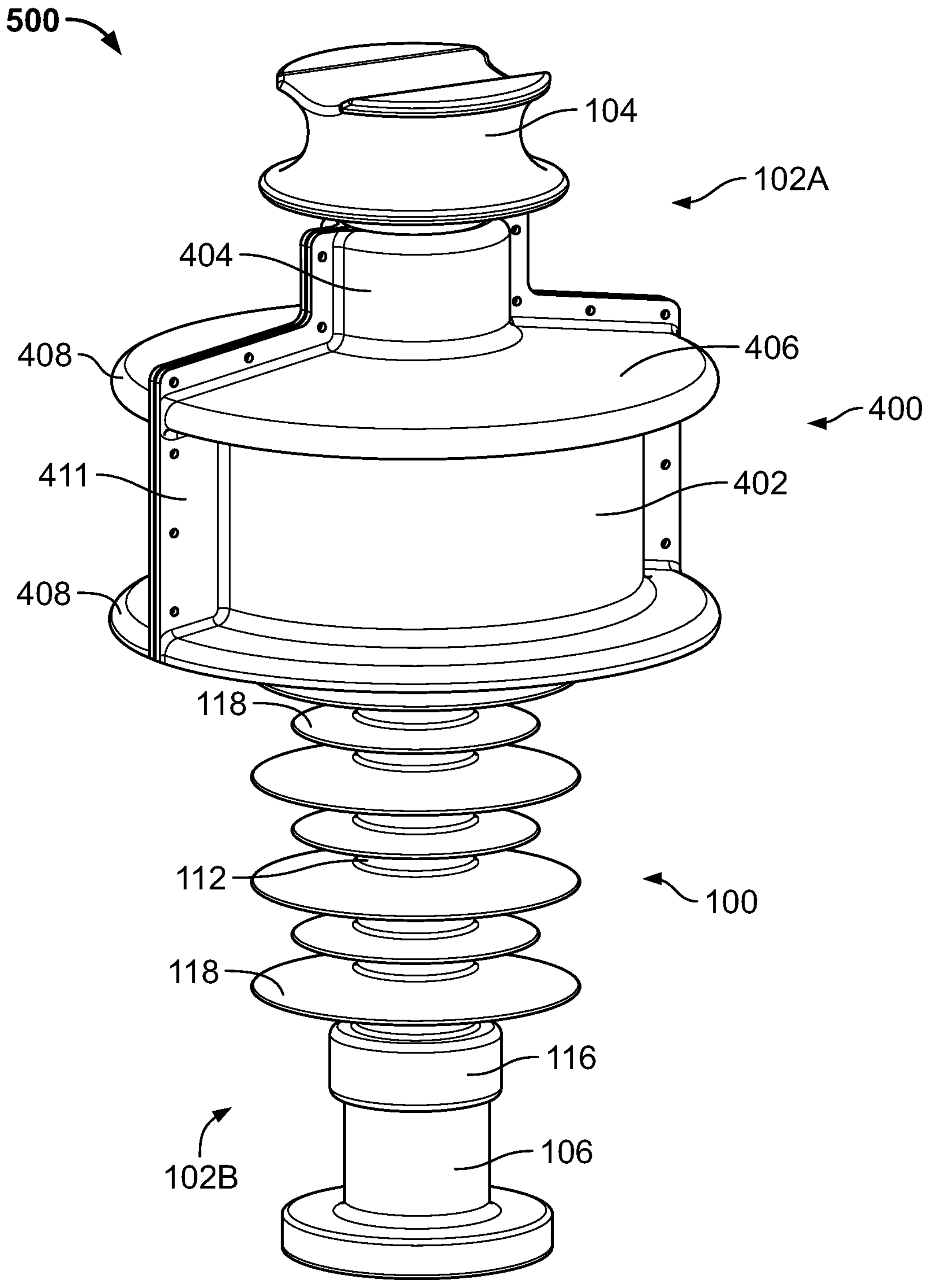
FIG. 6A is a perspective view of another assembly adapted for mitigating dry band arcing utilizing the cover of FIGS. 5A-5C according to embodiments of the present invention.
Figure 6B:
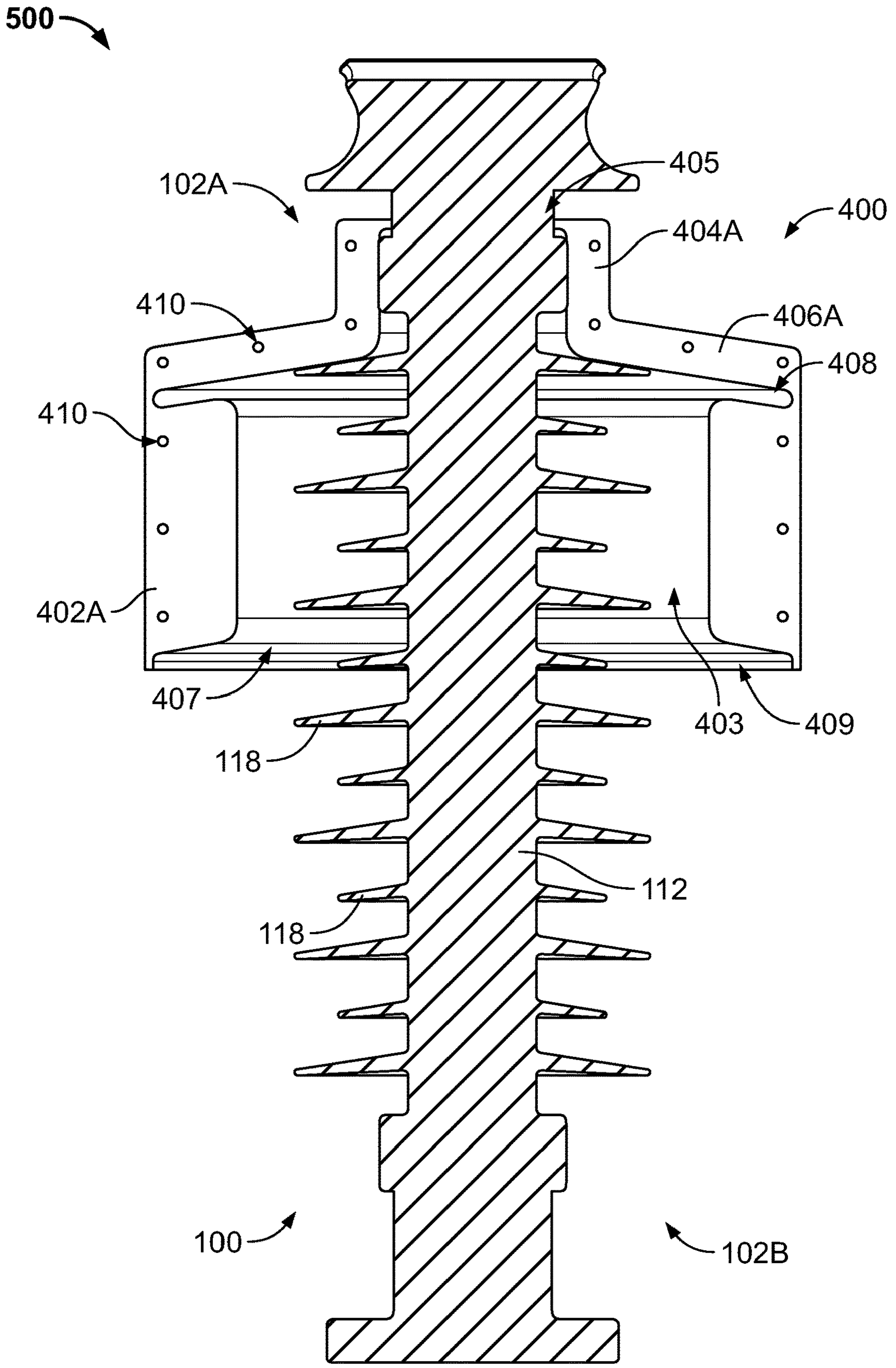
FIG. 6B is a cross-sectional side view of the assembly of FIG. 6A.
Figure 7:
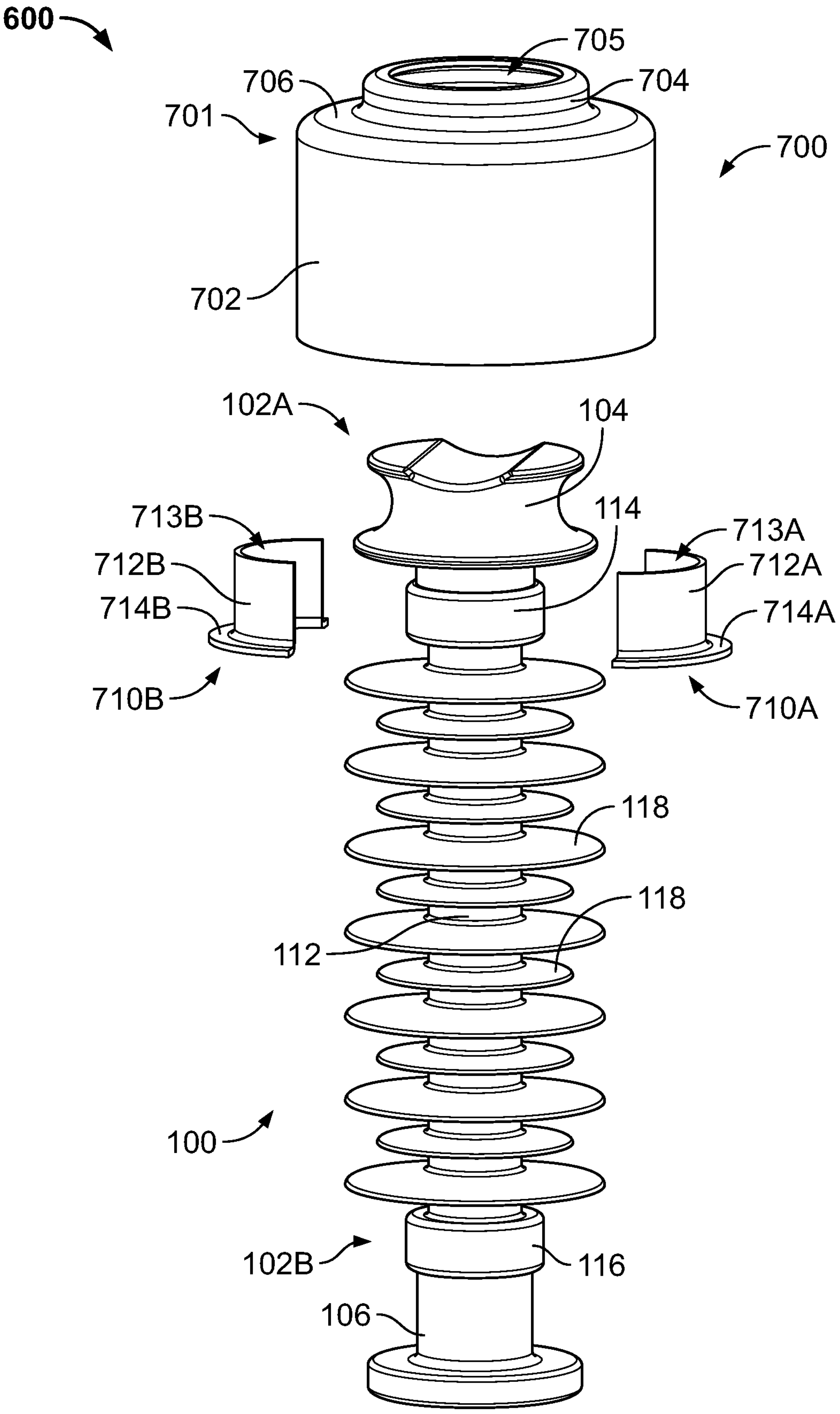
FIG. 7 is an exploded perspective view of another assembly adapted for mitigating dry band arcing according to embodiments of the present invention.

As shown in FIGS. 1A-1B, the insulator 100 includes a core 110 and a housing 112 (see also, e.g., FIG. 4B and FIGS. 6-7). The core 110 has a longitudinal axis LC-LC that is coaxial with the lengthwise axis L-L of the insulator 100. The core 110 may be cylindrical in shape and extends from a first or upper end 110A to an opposing second or lower end 110B. The core 110 can be formed of any suitable dielectric or electrically insulating material. End fittings 104, 106 are affixed to opposing ends of the core 110. The end fittings 104, 106 can be formed of any suitable material, and are typically formed of metal, such as steel, cast or ductile iron, aluminum, and stainless steel.

The housing 112 circumferentially surrounds the core 110. The housing 112 includes an upper end section or joint section 114 and a lower end section or joint section 116. The upper joint section 114 overlaps end fitting 104 and the lower joint section 116 overlaps end fitting 106. A series of axially spaced apart, annular sheds or skirts 118 project radially outwardly from an outer surface of the housing 112. The housing 112 can be formed of any suitable dielectric or electrically insulating polymeric material, for example, silicone rubber, ethylene-vinyl acetate (EVA), ethylene propylene diene monomer (EPDM) rubber, or other suitable rubber or other elastomeric and/or polymeric material. These components of the insulator 100 will be well-known to those of ordinary skill in the art and need not be described in further detail herein.

In general, the end of the insulator 100 that is connected to a power line (e.g., the top end 102A) has a higher electrical energy (higher voltage) than the opposing lower voltage or grounded end of the insulator 100 (e.g., the bottom end 102B). In other words, the electrical stress on the insulator 100 decreases along the lengthwise axis L-L of the insulator as you travel from the higher energized (voltage) top end 102A to the lower voltage or grounded bottom end 102B. Dry band arcing is more likely to occur proximate to the higher energized top end 102A of the insulator 100.

Figure 2:
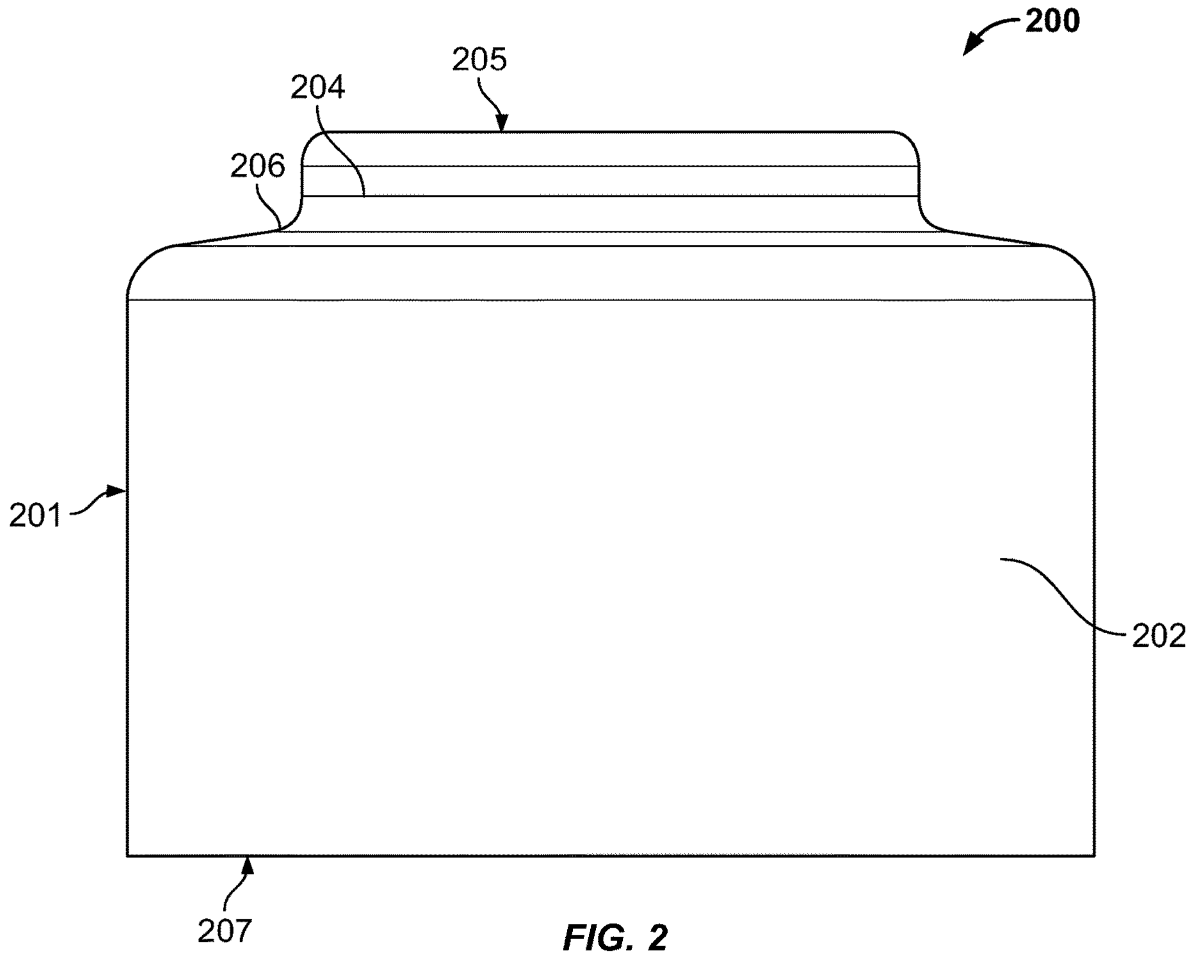
FIG. 2 is a side view of a cover for a polymeric insulator for power distribution lines according to embodiments of the present invention.

A cover 200 for an insulator 100 according to embodiments of the present invention is illustrated in FIG. 2. As described in further detail herein, according to embodiments of the present invention, the cover 200 may be adapted for use on insulators 100 for power distribution lines as described herein (i.e., assembly 300 shown in FIGS. 3-4B) to help mitigate dry band arcing from occurring along the insulator 100, for example, from occurring proximate to the higher voltage top end 102A of the insulator 100.

Figure 3:
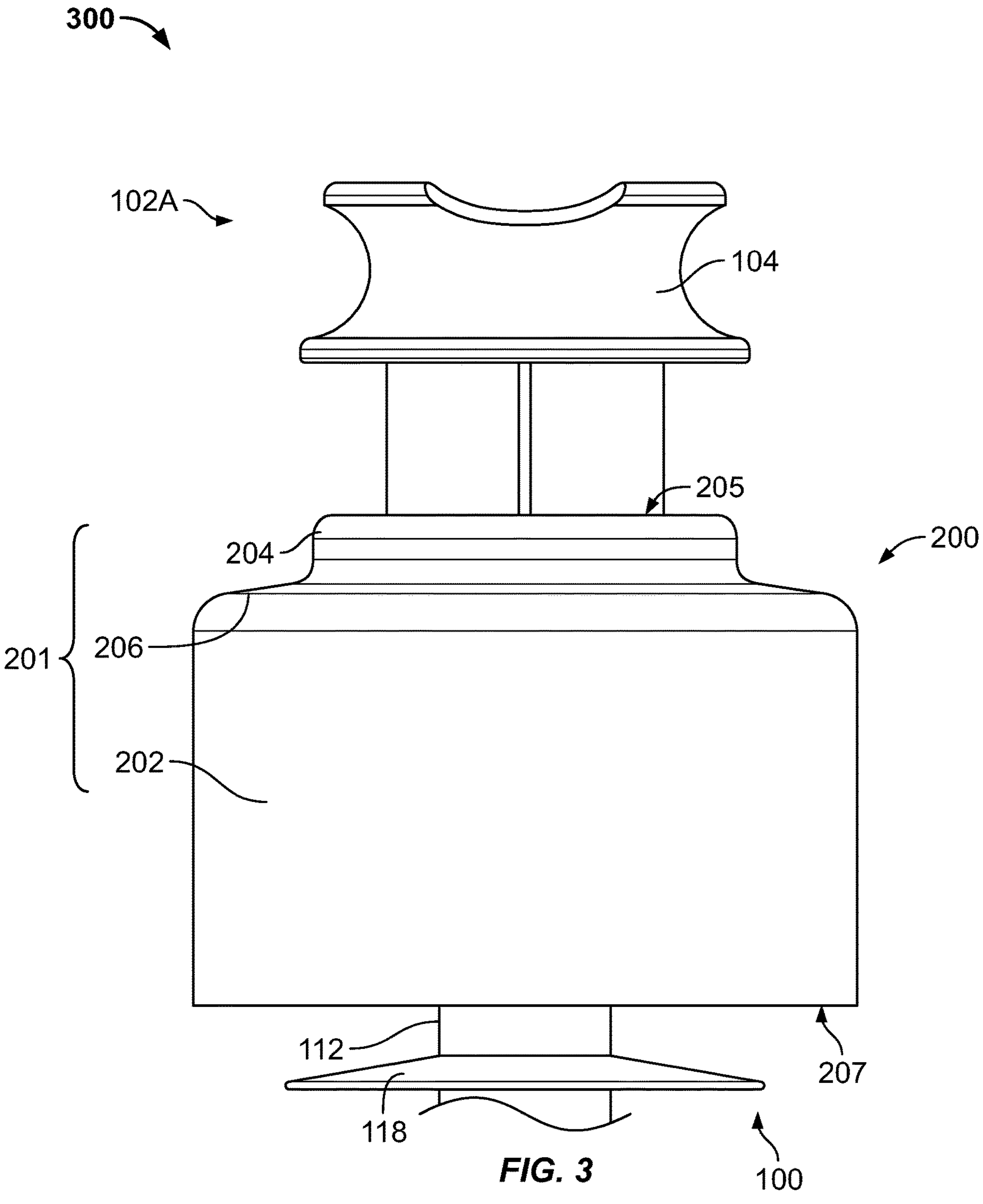
FIG. 3 is an enlarged side view of the cover of FIG. 2 mounted on the insulator of FIG. 1A.

As shown in FIGS. 2-4B, the cover 200 includes a main body or shroud portion 201. The main body 201 includes a sidewall 202 and a top wall 206 that together define a cavity 203. In some embodiments, the sidewall 202 is cylindrical. As shown in FIG. 4B, the cavity 203 of the cover 200 is adapted to receive one or more of the annular sheds or skirts 118 of the insulator 100. For example, as shown in FIG. 3 and FIG. 4B, in some embodiments, the cavity 203 is sized and configured to receive two or three of the annular sheds 118 of the insulator 100. In other embodiments, the cavity 203 is sized and configured to receive more than three of the annular sheds 118 (see, e.g., FIG. 6). Generally, the main body 201 of the cover 200 provides coverage of the upper one or more annular sheds 118 of the insulator 100, i.e., the cover 200 is mounted to the top end 102A of the insulator 100. An inner diameter (D) of the cavity 203 of the cover 200 can vary to accommodate different sized sheds 118. For example, in some embodiments, the inner diameter of the cavity 203 may be in a range of about 2 inches to about 7 inches.

The lower edge of the sidewall 202 defines a lower opening 207 that communicates with the cavity 203. In some embodiments, the top wall 206 comprises an upper opening 205 that communicates with the cavity 203 as well. In some embodiments, the main body 201 further includes a collar 204 extending upwardly from the top wall 206. In some embodiments, the upper edge of the collar 204 defines the upper opening 205 that communicates with the cavity 203. In some embodiments, the upper opening 205 is sized and configured to form an interference fit with the upper joint section 114 of the insulator 100. In some embodiments, the cover 200 may be formed as a monolithic or unitary component. The cover 200 may be formed of silicone rubber, EVA, EPDM, or other suitable rubber or other elastomeric and/or polymeric material. In some embodiments, the cover 200 is formed via injection molding.

As shown in FIGS. 2, 3 and 4B, in some embodiments, a top surface of the top wall 206 may be tapered or angled. In some embodiments, the top wall 206 may have a frustoconical shape. For example, in some embodiments, the top surface of the top wall 206 may taper downwardly away from the collar 204. The tapered or angled top surface, or frustoconical shape, of the top wall 206 allows for water and/or other environmental contaminants to flow off the top wall 206, and away from the insulator 100. As noted above, when an insulator 100 gets wet, a film of water forms on the surface (e.g., on the housing 112 and/or annular sheds 118) and a small leakage current may start to flow. When this film of water evaporates due to a rise in atmospheric temperature a "dry band" forms on the surface which interrupts the current flow and a voltage gradient appears across the dry band. This voltage gradient exerts electrostatic stress across the surface and causes further evaporation and an increase in the width of the dry band, thus causing a higher voltage gradient which causes minor arcing (i.e., dry band arcing). When placed on the insulator 100 (e.g., as part of the assembly 300 shown in FIGS. 3-4B), the cover 200 helps to prevent a film of water from forming on the housing 112 and/or sheds 118 of the insulator 100, and thus, helps to mitigate conditions that could cause dry band arcing. In addition, the cover 200 increases the creep or leakage distance along the surface of the insulator 100 between the conductive ends of the insulator 100, thereby helping to mitigate current leakage that may cause damage to and eventual failure of the insulator 100.

As shown in FIGS. 4A-4B, in some embodiments, the cover 200 may comprise an annular flanged edge 208A that extends radially outwardly from the top wall 206. In some embodiments, the cover 200 may further comprise a second annular flanged edge 208B that extends radially outwardly from the lower edge of the sidewall 202. In some embodiments, the annular flanged edges 208A, 208B may have a width in the range of about 3 inches to about inches. The annular flanged edges 208A, 208B further increase the creep or leakage distance along the surface of the insulator 100. In addition, the annular flanged edges 208A, 208B help to direct the flow of any water and/or other environmental contaminants off the surface of the cover 200 and further away from the insulator 100 (i.e., helps the water to roll off the cover 200).

The cover 200 may be mounted on the insulator 100 to form the assembly 300 in the following manner. In some embodiments, the cover 200 is factory installed on an insulator 100. In other embodiments, the cover 200 is retrofittable in the field on a pre-existing insulator 100. Installation of the cover 200 in the factory will depend on the type of insulator 100; the cover 200 can either be installed before or after the end fittings 104, 106 are affixed to the core 110 of the insulator 100. For over-molded insulators, the cover 200 will be installed after the end fittings 104, 106 are affixed to the core 110 of the insulator 100 and the polymer housing 112 is molded around the core 110. For non-over-molded insulators (i.e., insulators in which the housing 112 is molded to the core 110 prior to the end fittings 104, 106 being assembled), prior to the end fittings 104, 106 being affixed to the core 110 of the insulator 100, the cover 200 is forced downwardly onto the housing 112 such that one or more annular sheds 118 is received into the cavity 203 and a portion of the upper end section 114 is received through the upper opening 205. As the upper end section 114 is received through the upper opening 205, an interference fit may be formed between the cover 200 and the insulator 100, and in some embodiments, between the upper end section 114 and the upper opening 205. The interference fit helps prohibit water from entering through the upper opening 205 of the cover 200 and onto the upper portion of the housing 112 and/or sheds 118. In some embodiments, the polymeric material that forms the cover 200 gives the cover 200 a certain degree of flexibility, such that the upper opening 205 having a smaller diameter may be deflected or stretched to enable insertion of the larger diameter upper end section 114 of the housing 112. Once the upper end section 114 is positioned within the upper opening 205 of the cover 200, the resilient nature of polymeric material of the cover 200 allows the upper opening 205 to recover toward its original diameter, thereby securing the cover 200 to the insulator 100. Retrofit installation of the cover 200 occurs after the end fittings 104, 106 are assembled, and can be accomplished by either stretching the cover 200 over the existing end fitting 104 affixed to the top end 110A of the core 110 or by utilizing a cover having a two-piece construction, for example, cover 400 which will be described in further detail below.

Figure 5A:
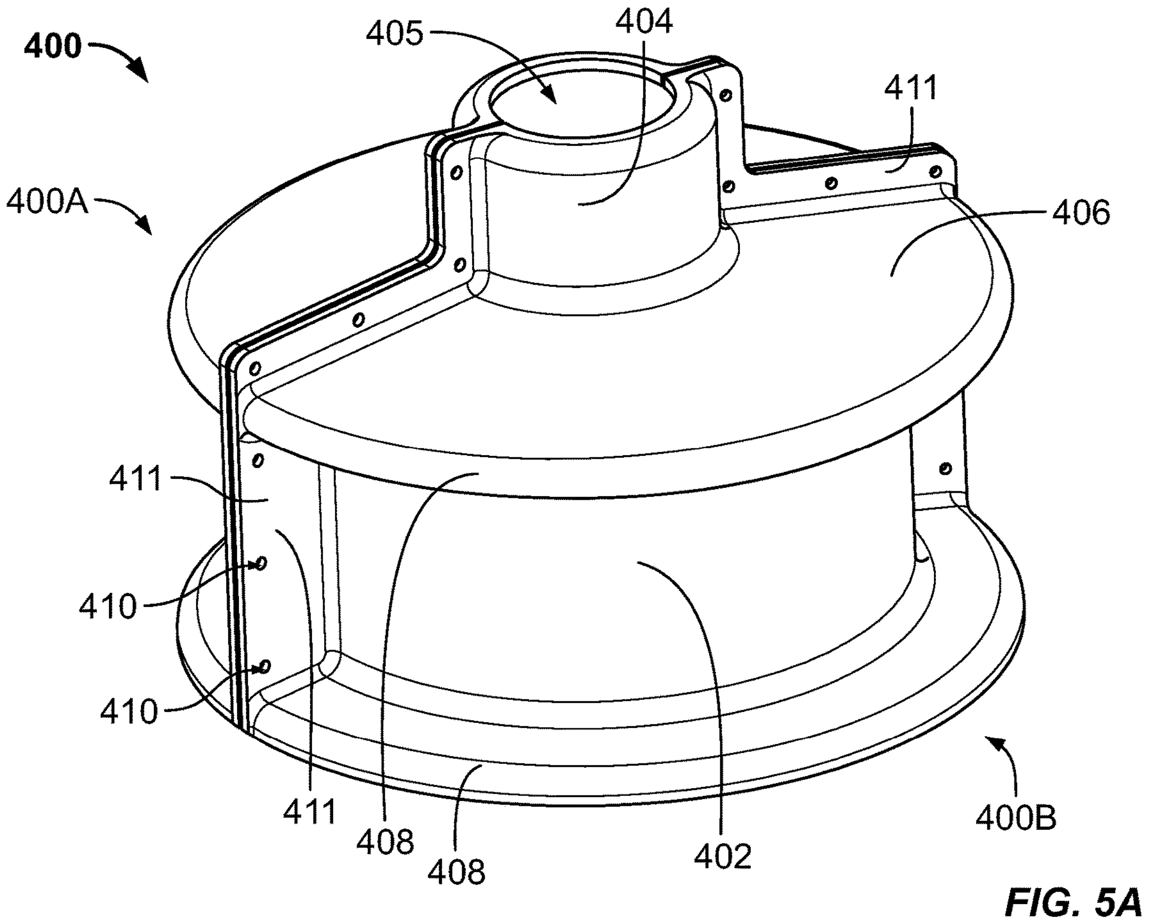
FIG. 5A is a perspective top view of an alternative cover for a polymeric insulator for power distribution lines according to embodiments of the present invention.
Figure 5B:
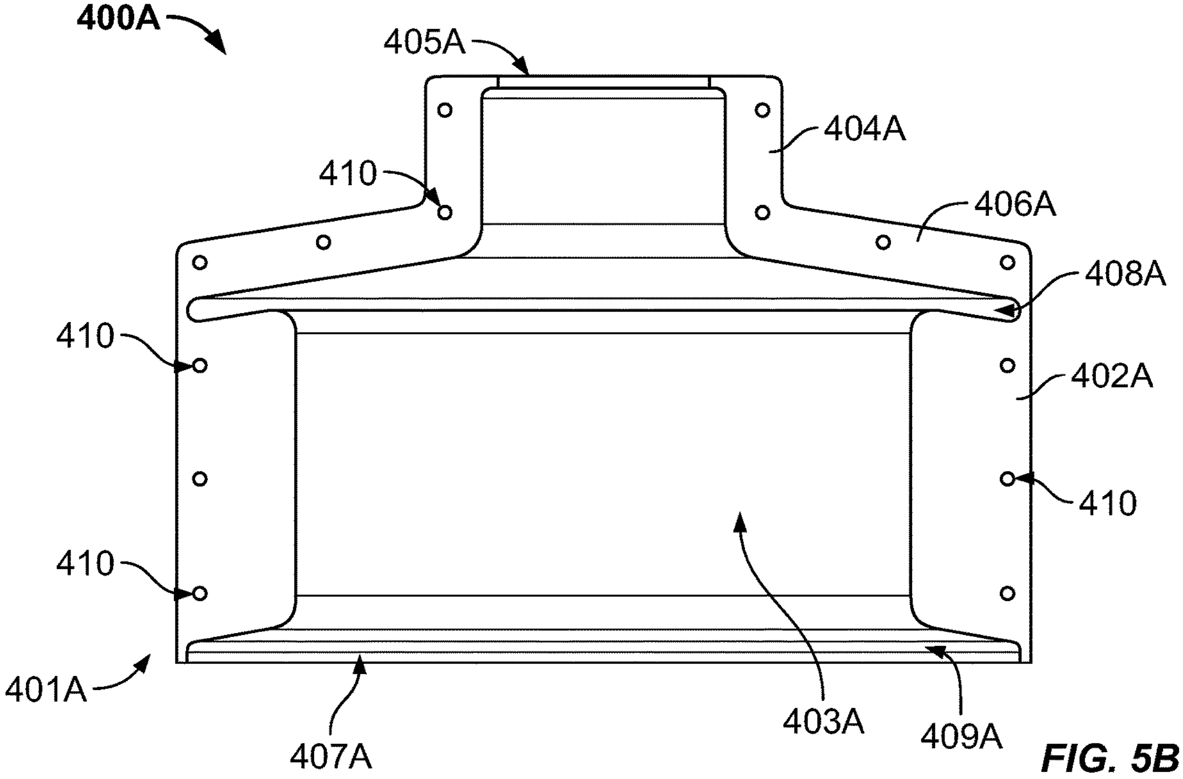
FIG. 5B is a cross-sectional side view of the cover of FIG. 5A.
Figure 5C:
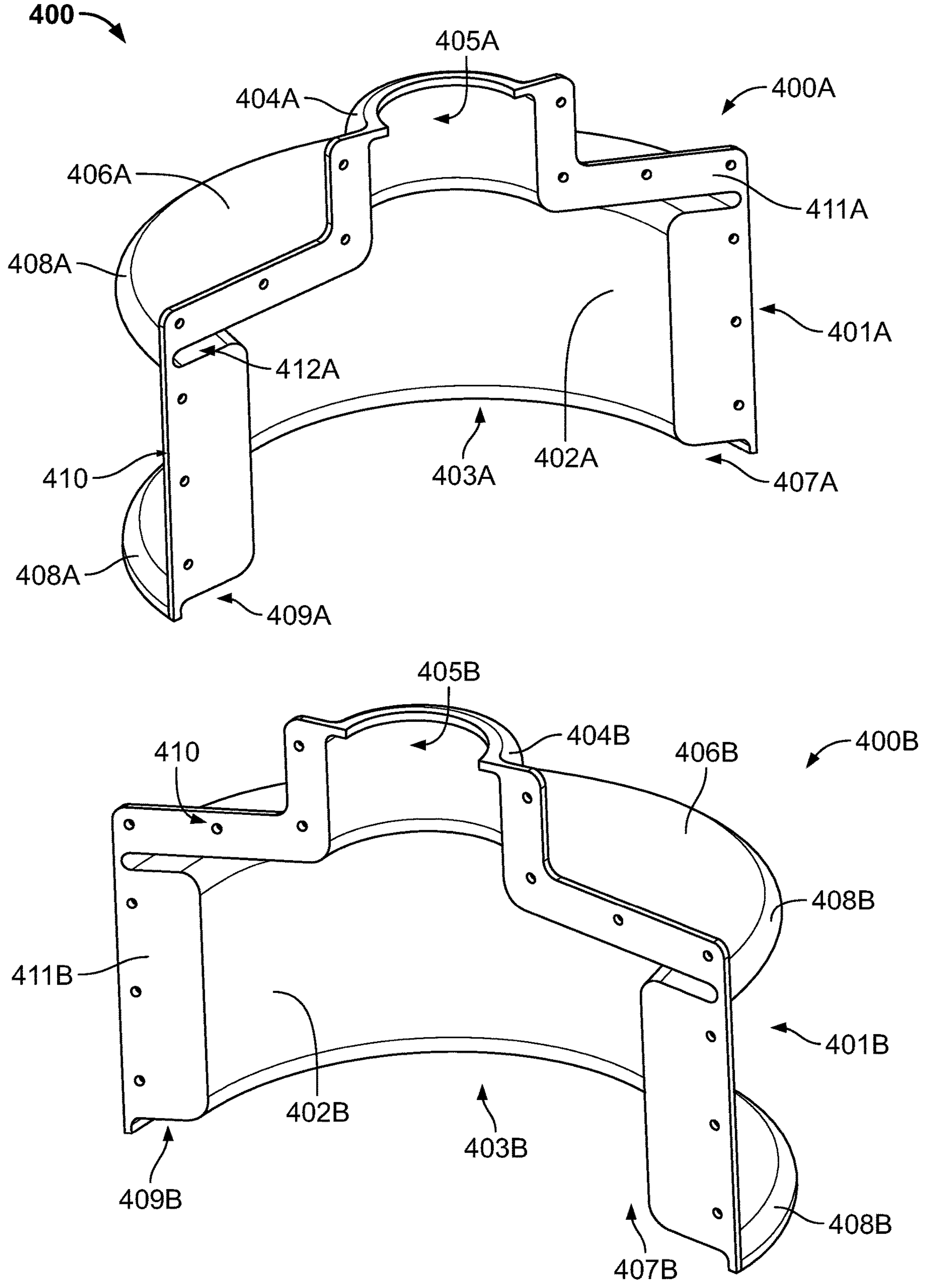
FIG. 5C is an exploded perspective view of the cover of FIG. 5A.

Referring to FIGS. 5A-5C, an alternative cover 400 for an insulator 100 according to embodiments of the present invention is illustrated. FIG. 6 illustrates an assembly adapted for mitigating dry band arcing 500 according to embodiments of the present invention that utilizes the cover 400 shown in FIGS. 5A-5C. Properties and/or features of the cover 400 or assembly 500 may be as described above in reference to the cover 200 or assembly 300 shown in FIGS. 2-4B and duplicate discussion thereof may be omitted herein for the purposes of discussing FIGS. 5A-5C and FIG. 6.

The cover 400 differs from the cover 200 described herein in that the cover 400 comprises a two-piece construction. The two-piece construction allows for the cover 400 to be retrofit to pre-existing insulators 100, for example, insulators 100 already installed in the field. As shown in FIGS. 5A-5C, the cover 400 comprises two substantially identical members 400A, 400B that are configured to engage and couple to each other. As shown in FIG. 5A, when the member 400A, 400B are engaged together, the cover 400 has a sidewall 402 and a top wall 406. The top wall 406 has an upper opening 405 configured to receive an upper end 102A of an insulator 100. In some embodiments, the cover 400 further has a collar 404 extending upwardly from the top wall 406. In some embodiments, the cover 400 may include annular flanged edges 408 extending radially outwardly from a lower edge of the sidewall 402 and/or the top wall 406. The annular flanged edges 408 further increase the creep or leakage distance along the surface of the insulator 100. In addition, the annular flanged edges 408 help to direct the flow of any water and/or other environmental contaminants off the surface of the cover 400 and further away from the insulator 100 (i.e., helps the water to roll off the cover 400).

In some embodiments, each member 400A, 400B includes a transition wall 411 comprising a plurality of securing features 410. The transition wall 411 is coupled to or integral with the sidewall 402, top wall 406, and collar 404 (where applicable). As discussed in further detail below, the transition wall 411 of each member 400A, 400B provides a contact surface for the members 400A, 400B to engage and be secured together on an insulator 100.

One of the members 400A is shown in FIG. 5B. In this embodiment, the members 400A, 400B are mirror images of one another and therefore at times only one of the members 400A may be described in detail, it being understood that such description applies likewise to the other member 400B. As shown in FIG. 5B, the member 400A has a main body or shroud portion 401A. The main body 401A includes a sidewall 402A and a top wall 406A that together define a cavity 403A. In some embodiments, the main body 401A further includes a collar 404A extending upwardly from the top wall 406A. In some embodiments, the main body 401A includes a transition wall 411A that is coupled to or integral with the sidewall 402A, top wall 406A, and collar 404A.

In some embodiments, the sidewall 402A includes one or more annular recesses 409A, 412A. The recesses 409A, 412A allow the cover 400 to conform to the sheds 118 on the insulator 100 and also provide additional creepage distance. The main body 401A (e.g., transition wall 411A) comprises a plurality of securing features 410 that are configured to engage corresponding securing features 410 on the other main body 401B. In some embodiments, the securing features 410 may comprise a snap-fit mechanism such as a ball or cylinder snap-in or a prolonged snap-in. In some embodiments, rivets or screws made from nonconductive materials may be used to secure the main bodies 401A, 401B of the cover 400 together. Alternatively, in some embodiments, the main bodies 401A, 401B of the cover 400 may be glued or otherwise sealed together. When the main bodies 401A, 401B of each member 400A, 400B (e.g., the transition walls 411) are engaged (i.e., secured together), the respective cavities 403A, 403B together define a main cavity 403 of the cover 400. Similar to the cavity 203 of cover 200 described herein, the main cavity 403 of cover 400 is adapted to receive one or more of the annular sheds or skits 118 of the insulator 100 (see, e.g., FIG. 6). Generally, the cover 400 provides coverage of the upper one or more annular sheds 118 of the insulator 100, i.e., the cover 400 is mounted to the top end 102A of the insulator 100.

In some embodiments, the lower edges of the sidewalls 402A, 402B together define a lower opening 507 that communicates with the main cavity 403. In some embodiments, the top walls 406A, 406B cooperate together to define an upper opening 405 that communicates with the main cavity 403 as well. In some embodiments, the upper edges of the collars 404A, 404B cooperate together to define the upper opening 405 that communicates with the main cavity 403. Similar to the cover 200 described herein, in some embodiments, a top surface of the top wall 406A, 406B may be tapered or angled to allow for water and/or other environmental contaminants to flow off the cover 400 and away from the insulator 100. The cover 400 may be formed of silicone rubber, EVA, EPDM, or other suitable rubber or other elastomeric and/or polymeric material. In some embodiments, the cover 400 is formed via injection molding.

The cover 400 may be mounted on a pre-existing insulator 100 to form assembly 500 in the following manner. The two members 400A, 400B are aligned such that an inner surface of the respective top walls 406A, 406B are positioned above the uppermost shed 118 of the insulator 100 and the corresponding securing features 410 of each member 400A, 400B are in alignment. The two members 400A, 400B are forced (e.g., pressed or glued together) together such that the corresponding securing features 410 on the transition walls 411 engage and secure the two members 400A, 400B together. In some embodiments, the two members 400A, 400B are secured together with a room-temperature-vulcanizing silicone (RTV) sealant to help prevent moisture between the two members 400A, 400B. As shown in FIG. 6, when the two members 400A, 400B are forced together, at least a portion of one or more annular sheds 118 is received into the respective cavities 403A, 403B such that the mated members 400A, 400B of the cover 400 provide coverage to at least one or more of the annular sheds 118 of the insulator 100. In some embodiments, a portion of the upper end section 114 of the housing 112 of the insulator 100 is received through the upper opening 405. As the upper end section 114 is received through the upper opening 405 formed in the top wall 406 of the cover 400 when the two members 400A, 400B are mated together.

When placed on the insulator 100 (e.g., as part of the assembly 500 shown in FIG. 6), the cover 400 helps to prevent a film of water from forming on the housing 112 and/or sheds 118 of the insulator 100, and thus, helps to mitigate conditions that could cause dry band arcing. In addition, the cover 400 increases the creep or leakage distance along the surface of the insulator 100 between the conductive ends of the insulator 100, thereby helping to mitigate current leakage that may cause damage to and/or eventual failure of the insulator 100.

Referring to FIGS. 6-7, an assembly adapted for mitigating dry band arcing 600 according to embodiments of the present invention is illustrated. Properties and/or features of the assembly 600 may be as described above in reference to the assemblies 300, 400 shown in FIGS. 2-4B and FIG. 5 and duplicate discussion thereof may be omitted herein for the purposes of discussing FIGS. 6-7.

The assembly 600 differs from the assemblies 300, 400 in that the assembly 600 includes a three-piece cover 700. Similar to the two-piece cover 400 described herein, the three-piece construction of cover 700 allows for the cover 700 to be retrofit to pre-existing insulators 100, for example, insulators 100 already installed in the field.

Figure 8A:
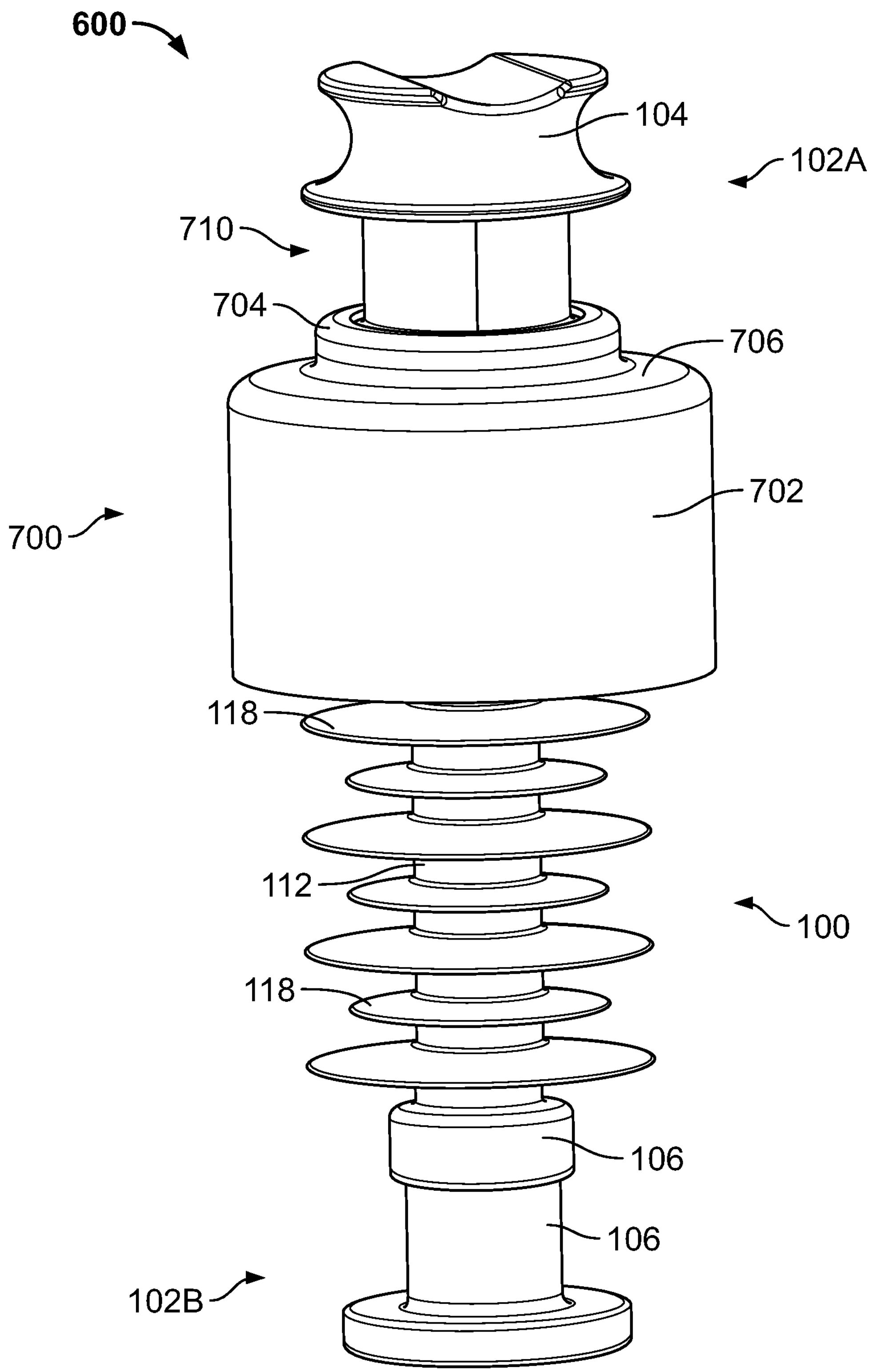
FIG. 8A is a perspective view of the assembly of FIG. 7.
Figure 8B:
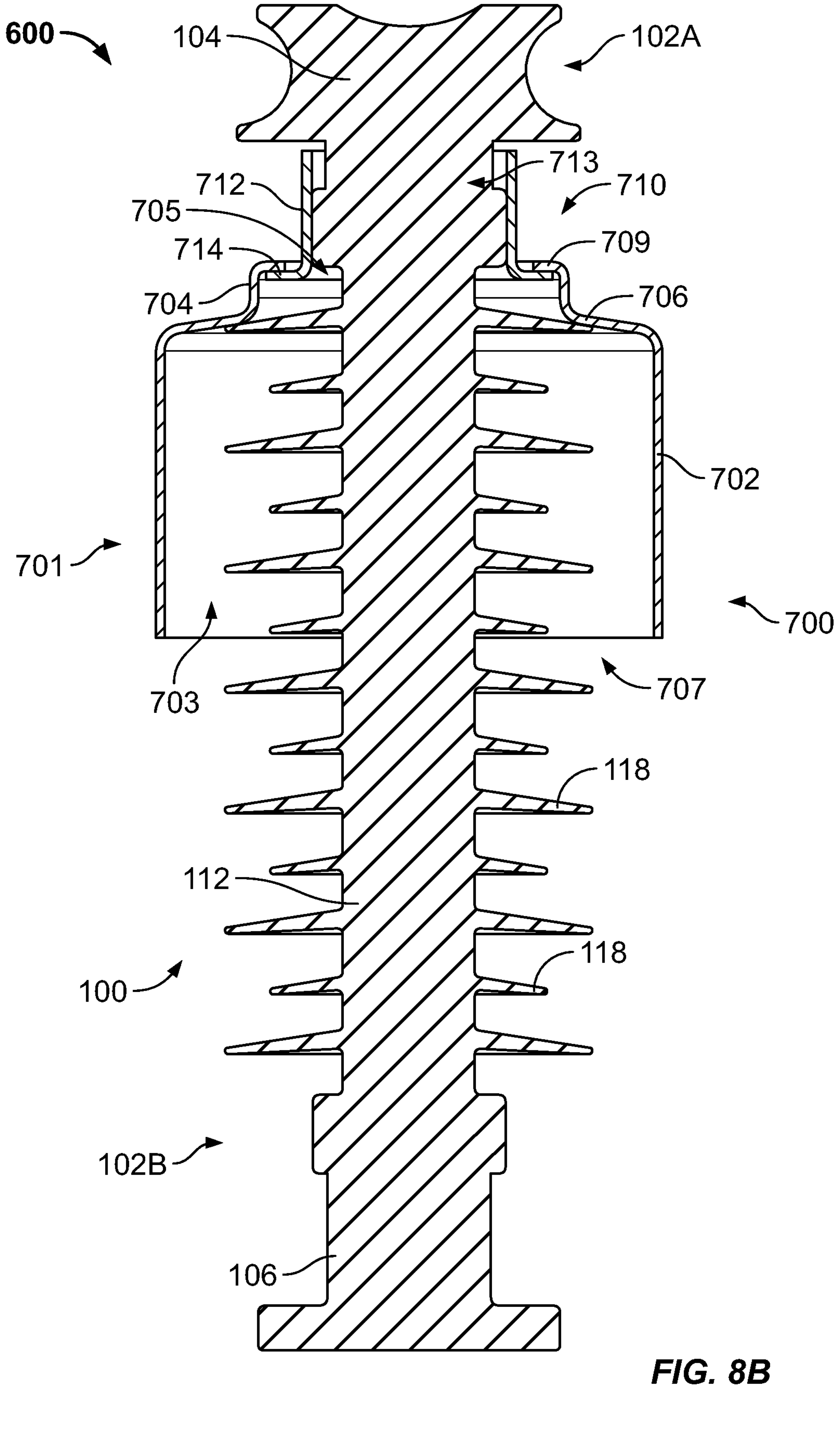
FIG. 8B is a cross-sectional side view of the assembly of FIG. 8A.

As shown in FIGS. 7 and 8, similar to the cover 200 described herein, the cover 700 includes a main body or shroud portion 701. The main body 701 includes a sidewall 702 and a top wall 706 that together define a cavity 703. In some embodiments, the sidewall 702 is cylindrical. As shown in FIG. 8, the cavity 703 of the cover 700 is adapted to receive one or more of the annular sheds or skits 118 of the insulator 100. Generally, the main body 701 of the cover 700 provides coverage of the upper one or more annular sheds 118 of the insulator 100, i.e., the cover 700 is mounted to the top end 102A of the insulator 100.

The lower edge of the sidewall 702 defines a lower opening 707 that communicates with the cavity 703. In some embodiments, the top wall 706 comprises an upper opening 705 that communicates with the cavity 703 as well. In some embodiments, the main body 701 further includes a collar 704 extending upwardly from the top wall 706. In some embodiments, the upper edge of the collar 704 defines the upper opening 705 that communicates with the cavity 703. In some embodiments, the top wall 706 or collar 704 includes an annular lip 709 around the upper opening 705. In some embodiments, the main body 701 of the cover 700 may be formed as monolithic or unitary component. The cover 700 may be formed of silicone rubber, EVA, EPDM, or other suitable rubber or other elastomeric and/or polymeric material. In some embodiments, the cover 700 is formed via injection molding. As shown in FIGS. 7 and 8, in some embodiments, a top surface of the top wall 706 may be tapered or angled. For example, in some embodiments, the top surface of the top wall 706 may taper downwardly away from the collar 704. The tapered or angled surface of the top wall 706 allows for water and/or other environmental contaminants to flow off the top wall 706 and away from the insulator 100.

As shown in FIG. 7, the cover 700 further includes two collar members 710A, 710B. In this embodiment, the collar members 710A, 710B are mirror images of one another and therefore at times only one of the collar members 710A may be described in detail, it being understood that such description applies likewise to the other collar member 710B.

Each collar members 710A, 710B includes an arcuate sidewall 712A, 712B and a flanged edge 714A, 714B extending radially outwardly from a lower edge of the respective sidewall 712A, 712B. The arcuate sidewalls 712A, 712B of the collar members 710A, 710B are sized and configured to receive the upper end section 114 of the insulator 100 therebetween. The sidewalls 712A, 712B are also sized and configured to be received through the upper opening 705 of the main body 701. As described in further detail below, the flanged edges 714A, 714B of the collar members 710A, 710B are configured to engage or contact the lip 709 residing around the upper opening 705 of the main body 701.

The cover 700 may be mounted on a pre-existing insulator 100 to form the assembly 600 in the following manner. Similar to the cover 200 described herein, in some embodiments, the cover 700 is factory installed on an insulator 100. In other embodiments, the cover 700 is retrofittable in the field on a pre-existing insulator 100. Installation of the cover 700 in the factory will depend on the type of insulator 100; the cover 700 can either be installed before or after the end fittings 104, 106 are affixed to the core 110 of the insulator 100.

For non-over-molded insulators (i.e., insulators in which the housing 112 is molded to the core 110 prior to the end fittings 104, 106 being assembled), the sidewalls 712A, 712B of the two collar members 710A, 710B are aligned with at least a portion of the upper end section 114 of the housing 112 of the insulator 100 therebetween. The main body 701 is forced downwardly onto the housing 112 such that one or more annular sheds 118 is received into the cavity 703 and the sidewalls 712A, 712B of the collar members 710A, 710B, as well as a portion of the upper end section 114 of the housing 112 is received through the upper opening 705. The main body 701 is forced downwardly until the flanged edges 714A, 714B of the collar members 710A, 710B engage or contact the annular lip 709 of the main body 701. The top wall 706 and/or collar 704 of the main body 701 provide a radially inwardly force on the sidewalls 712A, 712B of the collar members 710A, 710B, thereby securing the upper end section 114 of the housing 112 between the sidewalls 712A, 712B.

For over-molded insulators, the cover 700 will be installed after the end fittings 104, 106 are affixed to the core 110 of the insulator 100 and the polymer housing 112 is molded around the core 110. The sidewalls 712A, 712B of the two collar members 710A, 710B are aligned with at least a portion of the upper end section 114 of the housing 112 of the insulator 100 therebetween. The cover 700 is stretched over the existing end fitting 104 affixed to the top end 110A of the core 110 and over the two collar members 710A, 710B. The main body 701 is forced downwardly until the flanged edges 714A, 714B of the collar members 710A, 710B engage or contact the annular lip 709 of the main body 701. The top wall 706 and/or collar 704 of the main body 701 provide a radially inwardly force on the sidewalls 712A, 712B of the collar members 710A, 710B, thereby securing the upper end section 114 of the housing 112 between the sidewalls 712A, 712B.

When placed on the insulator 100 (e.g., as part of the assembly 600 shown in FIG. 6), the cover 700 helps to prevent a film of water from forming on the housing 112 and/or sheds 118 of the insulator 100, and thus, helps to mitigate conditions that could cause dry band arcing. In addition, the cover 700 increases the creep or leakage distance along the surface of the insulator 100 between the conductive ends of the insulator 100, thereby helping to mitigate current leakage that may cause damage to and/or eventual failure of the insulator 100.

In some embodiments, similar to cover 200 described herein, the cover 700 may comprise one or more annular flanged edges that extend radially outwardly from the top wall 706 and/or from the lower edge of the sidewall to further increase the creep or leakage distance along the surface of the insulator 100, as well as help to direct the flow of any water and/or other environmental contaminants from the surface of the cover 700 further away from the insulator 100.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An assembly adapted for mitigating dry band arcing, the assembly comprising:
- a polymeric insulator for a power distribution line, the insulator comprising:
  - a core;
  - two end fittings affixed to opposing ends of the core; and
  - a housing circumferentially surrounding the core, the housing including an upper end section and a lower end section each overlapping a respective end fitting, and a series of axially spaced apart annular sheds projecting radially outwardly from an outer surface of the housing; and
- a cover, the cover comprising a main body including a sidewall and a top wall, the sidewall and the top wall together define a cavity, wherein a lower edge of the sidewall defines a lower opening and the top wall comprises an upper opening, the lower and upper openings being in communication with the cavity,
- wherein at least a portion of the upper end section of the housing is received through the upper opening of the cover and one or more of the annular sheds are received within the cavity of the cover.

2. The assembly of claim 1, wherein the cover further comprises a collar extending upwardly from the top wall.

3. The assembly of claim 2, wherein an upper edge of the collar defines the upper opening in communication with the cavity.

4. The assembly of claim 1, wherein the upper opening of the cover is size and configured to form an interference fit with the upper end section of the housing of the insulator.

5. The assembly of claim 1, wherein a top surface of the top wall of the cover is tapered or angled.

6. The assembly of claim 1, wherein the cover is formed as a monolithic or unitary component.

7. The assembly of claim 1, wherein the cover is formed of at least one of silicone rubber, ethylene-vinyl acetate (EVA), and ethylene propylene diene monomer (EPDM) rubber.

8. The assembly of claim 1, wherein the cover further comprises a first annular flanged edge extending radially outwardly from the top wall.

9. The assembly of claim 8, wherein the cover further comprises a second annular flanged edge extending radially outwardly from the lower edge of the sidewall.

10. The assembly of claim 1, wherein the cover comprises two substantially identical members that are configured to engage each other to form the cavity.

11. The assembly of claim 1, wherein the cover further comprises two collar members, each collar member comprising an arcuate sidewall and flanged edge extending radially outwardly from a lower edge of the sidewall, wherein the sidewalls of the collar members are received through the upper opening of the main body such that the upper end section of the insulator is secured therebetween and the flanged edges of the collar members engage a lip around the upper opening of the main body.

12. A cover for an insulator for a power distribution line, the cover comprising:
- a main body including a sidewall and a top wall, the sidewall and the top wall together define a cavity, a lower edge of the sidewall defines a lower opening in communication with the cavity and a top surface of the top wall of the cover is tapered or angled;
- a collar extending upwardly from the top wall, an upper edge of the collar defines an upper opening in communication with the cavity;
- wherein the upper opening is configured to receive at least a portion of a housing of the insulator and the cavity is configured to receive one or more annular sheds extending radially outwardly from the housing of the insulator.

13. The cover of claim 12, wherein the upper opening of the cover is sized and configured to form an interference fit with an upper end section of the housing of the insulator.

14. The cover of claim 12, wherein the main body is formed of at least one of silicone rubber, ethylene-vinyl acetate (EVA), and ethylene propylene diene monomer (EPDM) rubber.

15. The cover of claim 12, further comprising a first annular flanged edge extending radially outwardly from the top wall.

16. The cover of claim 15, further comprising a second annular flanged edge extending radially outwardly from the lower edge of the sidewall.

17. The cover of claim 12, wherein the cover comprises two substantially identical members that are configured to engage each other to form the cavity.

18. The cover of claim 12, further comprising two collar members, each collar member comprising an arcuate sidewall and flanged edge extending radially outwardly from a lower edge of the sidewall, wherein the sidewalls of the collar members are received through the upper opening of the main body such that the upper end section of the insulator is secured therebetween and the flanged edges of the collar members engage a lip around the upper opening of the main body.

* * * * *